Oct. 3, 1950     A. N. TODOROFF     2,524,686
FILM PROCESSING EQUIPMENT

Filed Aug. 16, 1947     2 Sheets-Sheet 1

INVENTOR
Alexander N. Todoroff

Oct. 3, 1950 A. N. TODOROFF 2,524,686
FILM PROCESSING EQUIPMENT
Filed Aug. 16, 1947 2 Sheets-Sheet 2

INVENTOR
Alexander N. Todoroff

Patented Oct. 3, 1950

2,524,686

UNITED STATES PATENT OFFICE 2,524,686

FILM PROCESSING EQUIPMENT

Alexander N. Todoroff, Chicago, Ill.

Application August 16, 1947, Serial No. 768,970

6 Claims. (Cl. 95—93)

My invention relates to improvements in photographic apparatus and more particularly in apparatus for processing long narrow strips of film or photographic material.

Before my invention the processing of long strips of three emulsion layer color film, 50 or 100 feet in length, such as used for amateur movies could not be done with present day amateur processing equipment. Reproducible and thoroughly satisfactory results in processing, formerly, required expensive precision developing machines using many gallons of expensive solutions. In my invention only about 3 pints of each solution are required to process 110 feet of 16 mm. movie films, while still keeping the film totally submerged.

There are three general types of photographic films, negative film, black-and-white reversal film and color film. The negative film is the easiest to process, it requiring roughly the following processing steps; developer, short stop and fixer. The negative film may be held in a number of ways just so the solutions reach the emulsion side of the film. There are processing reels known to the prior art that accomplish this purpose.

The black-and-white reversal film is more difficult to process, it requiring roughly the following processing steps; first developer, bleach, clearing bath, second exposure or flash, second developer and fixer. The second exposure or flash consists of exposing the undeveloped and unexposed silver. In black-and-white reversal film this may be done in two ways, first, by using a chemical flash consisting of a solution of sodium hydrosulfite and sodium bisulfite, second, by using a light. Black-and-white reversal film requires a second exposure or flash only on the emulsion side. If a chemical flash is used, a reel as mentioned in processing negative films may be used. If a light is used for the second exposure, the film may be wound on a squirrel cage type reel with the emulsion side of the film out so as to receive the proper exposure. Such a reel is known to the prior art but it has the disadvantage of only partially immersing the film in the solutions thus causing excessive aeration of the developers. A developing tank in which the film is wound from one spool to another spool while in the solution may also be used, but it has the disadvantage of increasing the processing time to more than double, because the chemicals can react on the film only when it is passing between spools. Also a shorter length of film may be passed more times between the spools in a given time thus making it difficult to determine the proper processing time. Developing reels or racks that do not permit free access of light to all portions of the film require that the wet film must be removed for the second exposure, then reloaded. For short lengths of film this can be done, but for long lengths of film, 50 or 100 feet, this is very difficult to do without damaging the film.

In my invention the reel and the container are made of a light-transmitting material, such as acrylic resins, commonly known as Lucite or Plexiglas which is optically clear and has the peculiar property of picking up light and conducting it around bends and to throw it out again at the end of a rod or the edge of a sheet, this edge-light effect, as is known to the plastic art, permits free access of light to reach all portions of the film without removing the film from the reel.

Color film is much more difficult to process it requiring roughly the following steps; first developer, short stop, second exposure, color developer, clearing bath, hardener and fixer. The second exposure for color film is more difficult to accomplish as both sides of the film must be exposed. The second exposure of color film cannot be done with a chemical if excellent results are to be achieved, it must be done with a light. Also in processing color film the chemical solutions must reach both sides of the film.

It is, therefore, among the objects of the present invention to provide a reel suitable for processing color film which holds the film in such a manner as to allow the solution to readily reach both sides of the film and also permit both sides of the film to be exposed to a light without removing the film from the reel.

Another object of the present invention is to provide a reel in which the second exposure can be made with the film on the reel while in cool water thus protecting the emulsion on the film from the heat of the light.

Another object of the present invention is to provide a reel which is easy to load without the use of a special loading device.

Another object of the present invention is to provide a reel in which a number of short strips of film can be processed at the same time without joining the strips together.

Another object of the present invention is to provide a reel which will hold sound film for processing so that neither side of the sound track area of the film is touched by the reel.

Objects and advantages other than those above set forth will be apparent to those skilled in the art from the following description when read in connection with the accompanying drawings, in which.

Similar numerals refer to similar parts throughout the several views.

Figure 1:
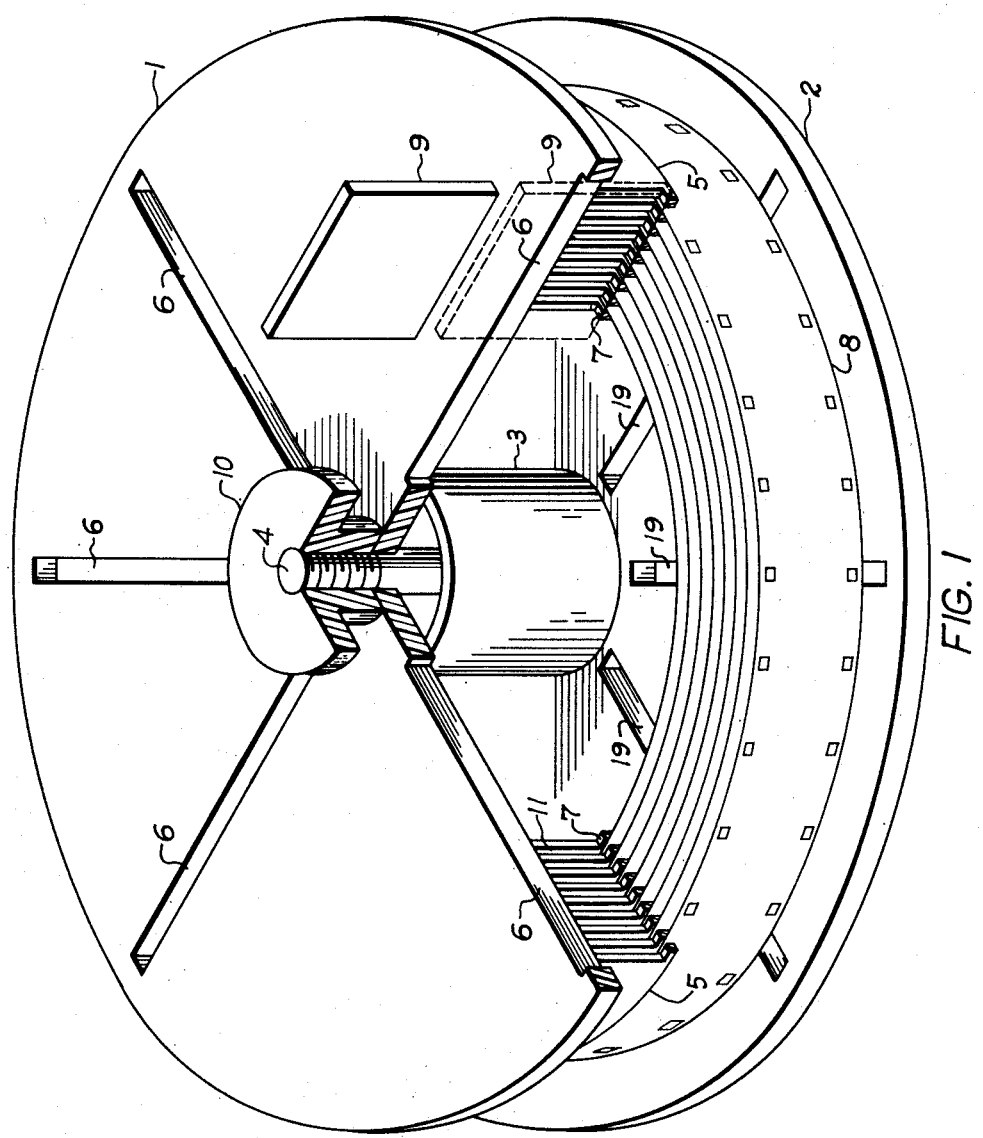
Fig. 1 is an isometric half section drawing of the reel showing the internal construction, with the film in processing position.

The reel shown in Fig. 1 with the film 8 in the processing position contains two disks 1 and 2. Disk 1 has a spiral groove 11 on the inner side deep enough to hold the film 8 while loading. Disks 1 and 2 are held apart by a cylinder 3 the length of which is governed by the width of the film 8 being processed. Disks 1 and 2 may also be held apart by suitable supports at the peripheries. A threaded rod 4 and the combination handle and nut 10 hold the disks 1 and 2 and the cylinder 3 together. Disk 1 has a number of slots 6. Where the spiral 5 passes under each slot 6 there is a slot 7 of the proper depth cut across the spiral 5. Disk 2 has a number of openings 19 to allow the solutions to reach the film 8 more readily.

Figure 3:
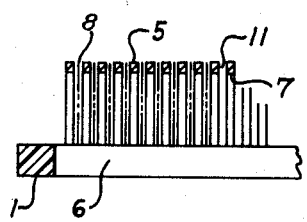
Fig. 3 illustrates the position of the film in the spiral grooves while loading.

To load the reel separate disks 1 and 2 by removing the combination handle and nut 10. Lay disk 1 down with the spiral 5 up. Starting from the periphery of spiral 5 fasten the end of the film 8 in the groove 11 by bending the end of the film 8 over on itself a few times and wedging it into the groove 11. Place the film 8 in the spiral groove 11. Fig. 3 shows the film 8 in the loading position, the end of which is wedged in the groove 11. After all the film 8 has been placed in the spiral groove 11 place the cylinder 3 at the center of disk 1, lay disk 2 on top of cylinder 3 and fasten disks 1 and 2 and the cylinder 3 together with the threaded rod 4 and the combination handle and nut 10. Now turn the reel over so disk 1 is on top and disk 2 is on the bottom. Then alternately place insert 9 through each slot 6 and into slot 7 and push the film 8 partially out of the spiral groove 11 down to disk 2 with insert 9. The insert 9 is a piece of flat material, which is not affected by the chemicals, with a straight edge on one end, thin and short enough to be inserted through slot 6 and into slot 7. Insert 9 must also be high enough to project out of slot 6 above disk 1 when insert 9 is at the bottom of slot 7. The film 8 is now in the position as shown in Fig. 1 and is ready to be immersed in the solutions for processing. Notice that only the upper margin of the film 8 comes in contact with the reel when in the processing position.

Figure 2:
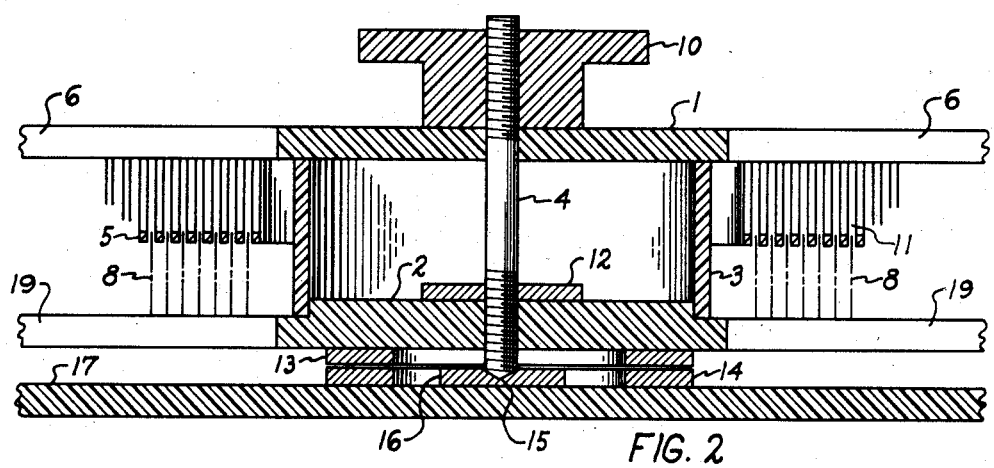
Fig. 2 is a cross-section of the center of the reel and container showing the pivot support.

The reel may now be placed in the container 17. (See Fig. 4.) In Fig. 2 the container 17 has a pivot support 16 and a bearing ring 14. On the bottom side of disk 2 there is a bearing ring 13 which co-operates with bearing ring 14, pivot support 16 and pivot point 15 to provide a means of supporting and rotating the reel in the container 17. The pivot point 15 is adjustable by turning the threaded rod 4 and then locking in place with lock nut 12. The reel may be rotated with the aid of insert 9 which is left in one slot 6 and slot 7 and projecting above disk 1.

Figure 4:
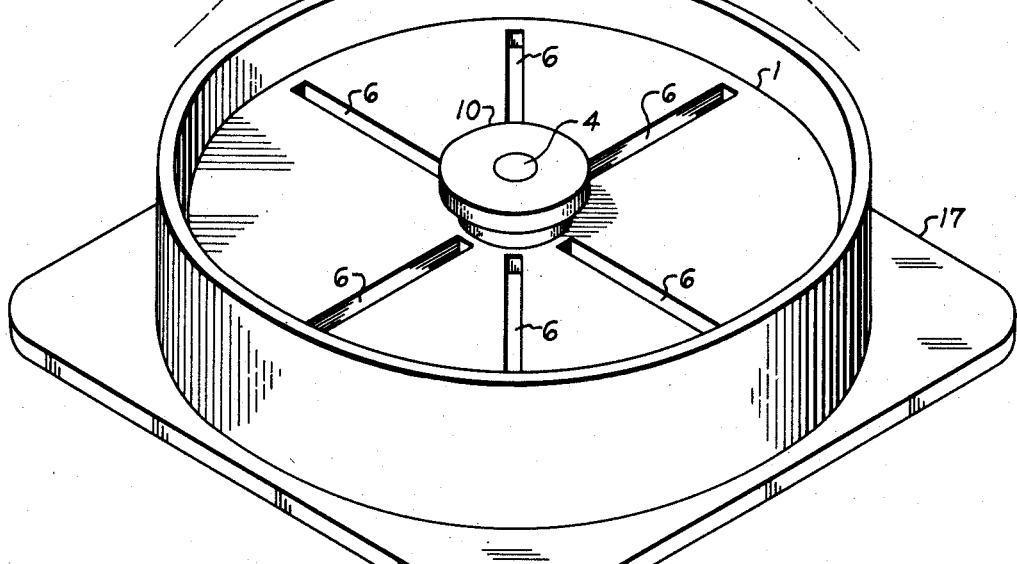
Fig. 4 shows the method of exposing the film on the reel to a light while in the container and under the protection of cool water or solution.

The method of exposing both sides of the film to a light 18 while on the reel and in the container 17 and under the protection of cool water or solution is shown in Fig. 4.

After processing is completed to remove the film 8 while still wet, the combination handle and nut 10 are removed and the disk 1 with the spiral groove 11 is lifted off while the reel is still in the water. The above operation must be done under water as this prevents the wet film 8 from adhering to the reel.

Having thus described my invention, what I desire to secure and obtain by Letters Patent is:

1. A reel for processing long narrow strips of photographic film comprising one upper and one lower disk members held apart by a suitable spacing means on which said upper disk member has a spiral groove on inner side thereof deep enough to hold the film while loading, means for positioning the film on said reel so that both sides of the picture area of the film are free from any contact with said reel or adjacent turns of film, said means consisting of a number of radially spaced slots cut through said upper disk member said slots extending in depth so as to cut radially through said spiral groove deep enough to permit pushing the film partially out of said spiral groove to the inner side of said lower disk member by the insertion of a straight-edged member to the bottom of said slots.

2. A reel for reversal processing of long narrow strips of photographic film comprising one upper and one lower disk members held apart by a suitable spacing means on which said upper disk member has a spiral groove on inner side thereof deep enough to hold the film while loading, means for positioning the film on said reel so that both sides of the picture area of the film are free from any contact with said reel or adjacent turns of film, said means consisting of a number of radially spaced slots cut through said upper disk member said slots extending in depth so as to cut radially through said spiral groove deep enough to permit pushing the film partially out of said spiral groove to the inner side of said lower disk member by the insertion of a straight-edged member to the bottom of said slots, means for exposing both sides of the film to actinic light without removing the film from said reel, said means comprising a material capable of transmitting actinic light from its edges of which said reel at least in part is made.

3. A reel for reversal processing of long narrow strips of photographic film comprising one upper and one lower disk members held apart by a suitable spacing means on which said upper disk member has a spiral groove on inner side thereof deep enough to hold the film while loading, means for positioning the film on said reel so that both sides of the picture area of the film are free from any contact with said reel or adjacent turns of film, said means consisting of a number of radially spaced slots cut through said upper disk member said slots extending in depth so as to cut radially through said spiral groove deep enough to permit pushing the film partially out of said spiral groove to the inner side of said lower disk member by the insertion of a straight-edged member to the bottom of said slots, means for exposing both sides of the film to actinic light without removing the film from said reel, said means comprising a material capable of transmitting actinic light from its edges of which said reel is wholly made.

4. Apparatus for processing long narrow strips of photographic film comprising in combination, a container, a reel rotatably disposed therein, means for pivotally rotating said reel in said container, said means comprising two bearing surfaces and a pivot point, said reel comprising one upper and one lower disk members held apart by a suitable spacing means on which said upper disk member has a spiral groove on inner side thereof deep enough to hold the film while loading, means for positioning the film on said reel so that both sides of the picture area of the film are free from any contact with said reel or adjacent turns of film, said means consisting of a number of radially spaced slots cut through said upper disk member said slots extending in depth so as to cut radially through said spiral groove deep enough to permit pushing the film partially out of said spiral groove to the inner side of said lower disk member by the insertion of a straight-edged member to the bottom of said slots.

5. Apparatus for reversal processing of long narrow strips of photographic film comprising in combination, a container, a reel rotatably disposed therein, means for pivotally rotating said reel in said container, said means comprising two bearing surfaces and a pivot point, said reel comprising one upper and one lower disk members held apart by a suitable spacing means on which said upper disk member has a spiral groove on inner side thereof deep enough to hold the film while loading, means for positioning the film on said reel so that both sides of the picture area of the film are free from any contact with said reel or adjacent turns of film, said means consisting of a number of radially spaced slots cut through said upper disk member said slots extending in depth so as to cut radially through said spiral groove deep enough to permit pushing the film partially out of said spiral groove to the inner side of said lower disk member by the insertion of a straight-edged member to the bottom of said slots, means for exposing both sides of the film to actinic light without removing the film from said reel and without removing said reel from said container, said means comprising a material capable of transmitting actinic light from its edges of which said reel and said container at least in part are made.

6. Apparatus for reversal processing of long narrow strips of photographic film comprising in combination, a container, a reel rotatably disposed therein, means for pivotally rotating said reel in said container, said means comprising two bearing surfaces and a pivot point, said reel comprising one upper and one lower disk members held apart by a suitable spacing means on which said upper disk member has a spiral groove on inner side thereof deep enough to hold the film while loading, means for positioning the film on said reel so that both sides of the picture area of the film are free from any contact with said reel or adjacent turns of film, said means consisting of a number of radially spaced slots cut through said upper disk member said slots extending in depth so as to cut radially through said spiral groove deep enough to permit pushing the film partially out of said spiral groove to the inner side of said lower disk member by the insertion of a straight-edged member to the bottom of said slots, means for exposing both sides of the film to actinic light without removing the film from said reel and without removing said reel from said container, said means comprising a material capable of transmitting actinic light from its edges of which said reel and said container are wholly made.

ALEXANDER N. TODOROFF.

REFERENCES CITED

The following references are of record in the file of this patent:

UNITED STATES PATENTS

| Number | Name | Date |
| --- | --- | --- |
| 2,248,179 | Miller | July 8, 1941 |
| 2,345,682 | Neuwirth | Apr. 4, 1944 |
| 2,351,396 | Broms | June 13, 1944 |

FOREIGN PATENTS

| Number | Country | Date |
| --- | --- | --- |
| 141,345 | Great Britain | Apr. 1, 1920 |
| 807,882 | France | Oct. 26, 1936 |
| 560,005 | Great Britain | Mar. 15, 1944 |